Oct. 30, 1923.
E. J. SWEETLAND
FILTER
Filed Dec. 24, 1917
1,472,098
3 Sheets-Sheet 1
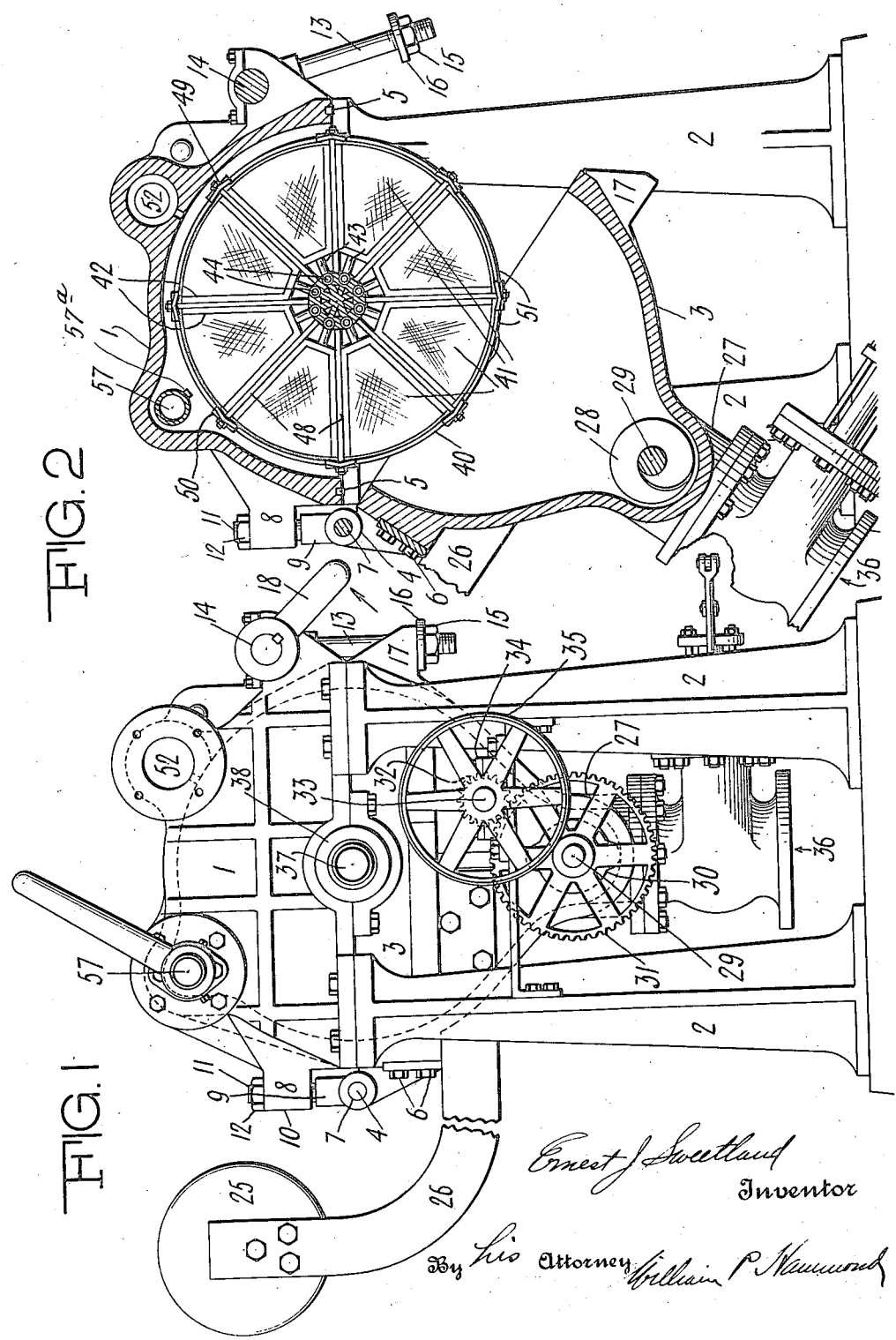
Ernest J Sweetland
Inventor
By his Attorney William P. Hammond

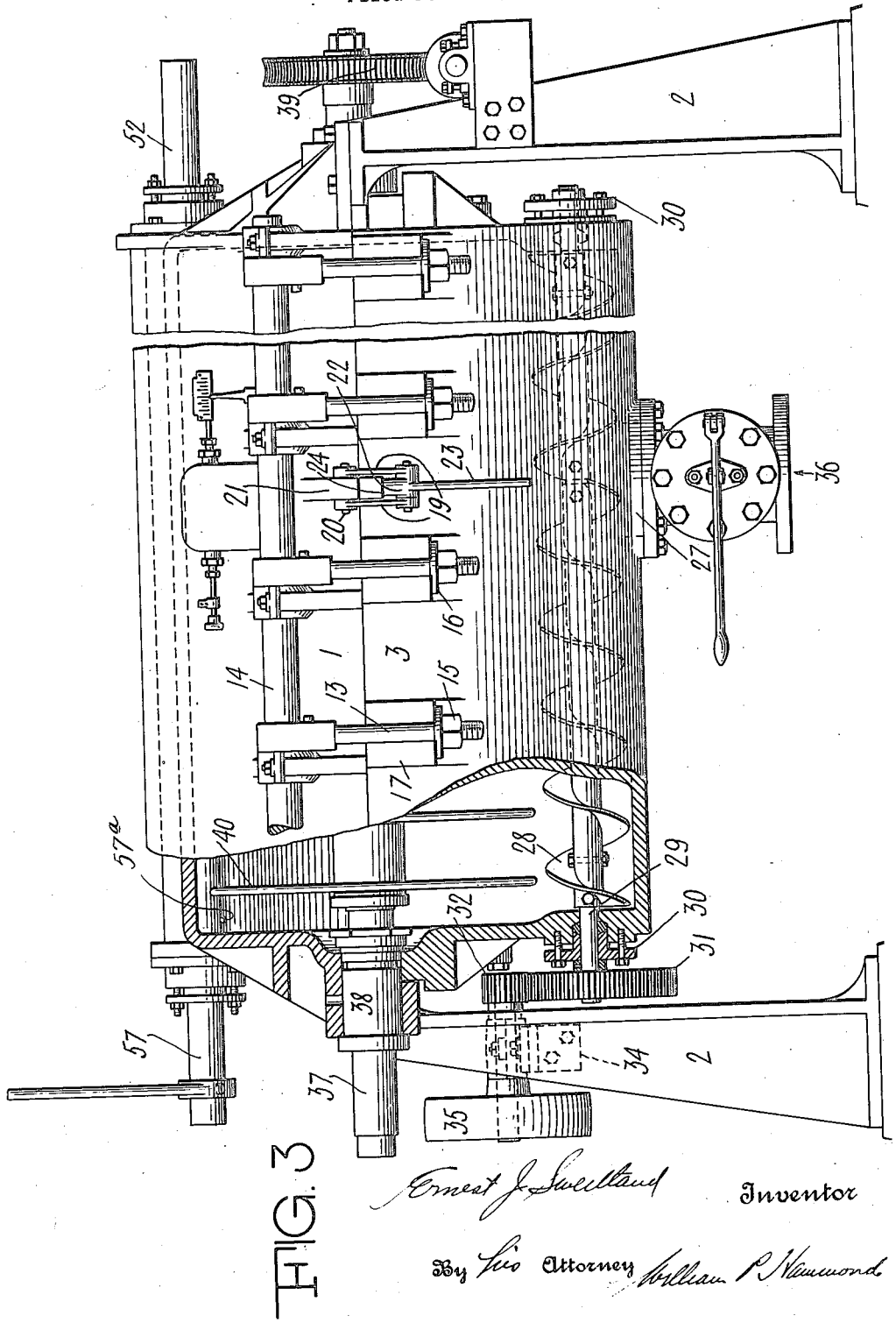

Oct. 30, 1923.

E. J. SWEETLAND

FILTER

Filed Dec. 24, 1917

Patented Oct. 30, 1923.

1,472,098

UNITED STATES PATENT OFFICE.

ERNEST J. SWEETLAND, OF MONTCLAIR, NEW JERSEY, ASSIGNOR TO UNITED FILTERS CORPORATION, OF SALT LAKE CITY, UTAH, A CORPORATION OF DELAWARE.

FILTER.

Application filed December 24, 1917. Serial No. 208,356.

*To all whom it may concern:*

Be it known that I, ERNEST J. SWEETLAND, a citizen of the United States, residing in Montclair, county of Essex, and State of New Jersey, have invented certain new and useful Improvements in Filters, of which the following is a specification.

The present invention relates in general to filters of the pressure type, such as illustrated and described in my Patent No. 1,313,929, dated August 25, 1919, in which the filter casing is formed in two hingedly connected parts in which a plurality of filter leaves are revolubly mounted for filtering liquid, one object of the invention being to provide a conveyor in the filter casing for forcibly discharging the disintegrated filter cakes from the casing after the filtering operation is completed, the said conveyor being adapted to be automatically connected to or disconnected from the driving element by the opening of the filter casing, thus enabling the casing to be opened for cleaning or other purposes while the driving element is in operation. As has been manifest, the conveyor becomes automatically inoperative upon the opening thereof.

For a full understanding of the invention, reference is to be had to the following description and accompanying drawings, in which—

Figure 1 is an end elevation of a filter constructed in accordance with the invention.

Figure 2 is a transverse vertical sectional view through the same, with the lower section of the casing swung downwardly into inoperative position.

Figure 3 is a side elevation of the filter, portions being broken away and shown in section to more clearly illustrate the details of the invention.

Corresponding and like parts are referred to in the following description and indicated in all the views of the drawings by the same reference characters.

Figure 4:
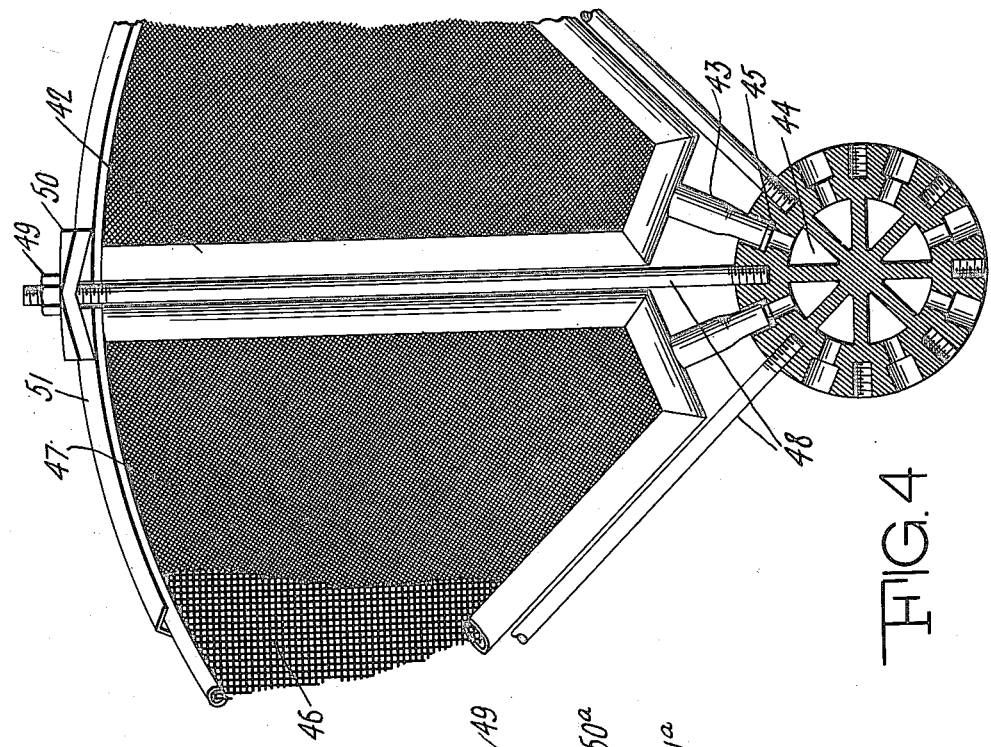
Figure 4 is an enlarged fragmentary plan view of two of the sections of one of the filter leaves, the central drainage pipe being shown in section.

The filter casing is constructed in substantially the same manner as that described in my aforesaid Patent No. 1,313,929, and comprises an upper semi-cylindrical member 1 which is supported on end posts or standards 2 and a lower semi-cylindrical member 3 which is preferably attached to the upper section along one side thereof by means of a plurality of hinges 4 thus forming a casing of the clam shell type. Gasket members 5 are arranged along the meeting edges of the two sections 1 and 3 so as to provide a liquid tight joint therebetween. One leaf of each of the hinge members 4 is permanently secured to the lower section 3 of the casing by means of bolts 6, and is provided with an upwardly extending lug or boss horizontally drilled for the reception of the pintle 7. The other leaf 8 of each hinge is adjustably secured to the upper section of the casing, preferably by means of an integral threaded stud 9 passing through a lug 10 and having its upper end 11 provided with a suitable nut 12 by which the stud and pintle may be vertically adjusted. This construction makes it possible to raise and lower the axis of the pintle of the hinge to take up the wear in the gaskets 5.

Along the opposite side of the filter is disposed a plurality of swing bolts 13 attached to a cam shaft 14 and having their lower extremities provided with nuts 15 and washers 16 adapted to engage lugs 17 projecting from the side of the lower section of the casing. A handle 18 is provided for turning the shaft 14 and thereby operating the swing bolts. The construction of the swing bolts and the cam shaft upon which they are mounted is described and claimed in my United States Patent No. 1,083,305, and need not be here set forth in detail, as they form no part of the present invention. It will suffice to say that the turning of the handle 18 in the direction of the arrow in Figure 2 first moves the bolts vertically downward until they are free from the lugs 17 and that further rotation of the handle then swings them to the right out of engagement with the lugs, thus releasing that edge of the lower section of the casing from the upper section of the casing, except for an auxiliary clamp (see Figure 3) consisting of links 19 pivotally secured at 20 to a lug 21 which may be integral with the upper section of the casing. The lower ends of the links are pivotally connected to a lever 22 provided at one end with a handle 23 and at the other with a locking arm 24 adapted to engage under the lower edge of the lug 21, and thus clamp the upper and lower sections of the casing firmly together when the handle of the lever is pushed inwardly toward the filter body. A counterweight 25 is secured by a curved arm 26 to the lower section of the casing so as to prevent the sudden dropping of the lower section of the casing when the swing bolts and locking device just described are released.

The lower section 3 of the casing is provided on its underside with a longitudinally extending discharge channel or passage 27 which receives a combination right and left-hand screw conveyor 28, the said conveyor being mounted upon a shaft 29 journaled in the ends of the lower section of the casing, stuffing boxes 30 being provided for preventing escape of the liquid in the casing around the shaft. A gear wheel 31 is rigidly secured to one end of the conveyor shaft 29 at the outside of the casing, and when the lower section of the casing is in an operative position, this gear wheel is adapted to mesh with a driving pinion 32 mounted on a shaft 33 journaled upon a bracket 34 carried by the end posts 2. A belt pulley 35 is also mounted on this shaft 33 and is adapted to receive power from any suitable source for driving the conveyor 28. A valved discharge opening 36 is provided in the lower casing at an intermediate point in the length of the discharge passage 27, and the screw conveyor 28 is adapted to feed the solid matter from both ends of the filter casing outwardly through this discharge opening 36. It will be noted with reference to Figures 1 and 2, that when the lower section of the filter casing is swung downwardly into an inoperative position the gear wheel 31 is automatically thrown out of mesh with the driving pinion 32, owing to the conveyor shaft being carried by the movable lower section of the casing, while the driving pinion is relatively fixed.

A longitudinally extending drainage pipe or conduit 37 is centrally arranged within the filter casing, and is journaled at each end in suitable bearings carried by the posts 2. The details of these bearings are substantially the same as those shown in connection with my aforesaid Patent No. 1,313,929, and need not be described in detail here. It is merely necessary to state that a suitable stuffing box 38 is provided at each end of the pipe 37 to prevent leakage of the liquid from the interior of the casing around the pipe. This pipe is adapted to be rotated by any suitable means, such as that indicated at 39.

A plurality of filter leaves 40 are mounted upon the central pipe 37, said filter leaves serving to separate the liquid from the solid matter in the liquid to be filtered. Each of these filter leaves comprises a plurality of sector shaped sections 41, each of said sections being formed with a sector shaped frame 42 which is U-shaped in cross section, as shown by Figure 4, the inner ends of each of the said frames being provided with a draining nipple 43 which loosely fits within a radially disposed opening 44 formed in the walls of the central pipe 37, packing washers 45 being arranged in said radial openings and engaging the ends of the nipples to form a liquid-tight joint. The body of each section of the filter leaves is formed in the same manner as the leaves in my before-mentioned copending application and comprises a central drainage member 46 formed of heavy wire on each side of which is arranged a layer of filter cloth 47, the said screen and cloth being clamped together in the sector shaped frame 42 as shown by Figure 4. The sector frames 42 are held rigidly but detachably in position on the central pipe 37 by a plurality of radially disposed supporting rods 48, the inner end of each of said rods being threaded into the central pipe, and one of said rods being arranged between each two of the sector frames. The outer ends of the supporting rods are threaded to receive clamping nuts 49 which engage the outer sides of clamping plates 50 which are rectangular in shape and have a V-shaped cross section, said plates being loosely fitted on the supporting rods. A segmental clamping rim member is arranged over the outer end of each of the sector frames 42 and is preferably V-shaped in cross section to overlap the sides of the sector frame. Each clamping plate 50 is adapted to engage the adjacent ends of two of these segmental clamping rim members 51, and when the clamping nuts 49 are secured tightly against the clamping plates 50, it will be seen that the sections of the filter leaves are securely held in position on the central pipe 37 so as to form in effect solid circular filter leaves. However, when it is desirable or necessary to remove one section on account of clogging or breaking thereof, the mere loosening of only two of the clamping nuts 49 will allow one section to be removed and replaced without disturbing the other sections. Such removal of the individual sections is facilitated by the two-part construction of the filter casing, since if the casing could not be opened longitudinally, it would be necessary to remove the whole filter leaves and central pipe through one end of the casing.

The liquid to be filtered is introduced into the interior of the filter casing through an inlet manifold 52, and it will be obvious that the only outlet for such liquid is through the filter cloth 47 of the sections of the filter leaves into the interior or drainage area of each section formed by the member 46. From this drainage area the clear filtrate flows through the draining nipples 43 and radial openings 44 into the central drainage pipe 37, and is then intended to be conveyed from the pipe 37 by any suitable means to a receptacle or to waste.

Figure 5:
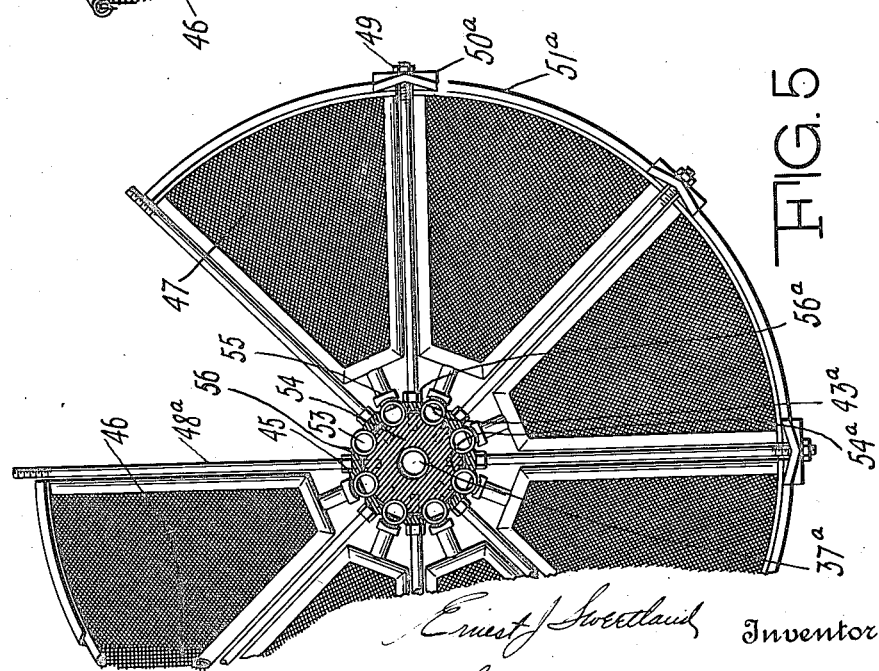
Figure 5 is a similar view showing a modified form of the parts shown in Fig. 4.

A modified construction of the filter leaves and their connection to the central drainage pipe is shown by Figure 5. In this construction, the sections of the filter leaves are formed in substantially the same manner as previously described, except that the inner ends of the draining nipples 43$^a$ are connected with a central drainage member consisting of a plurality of small drain pipes 53, equal in number to the sections of one filter leaf, said small pipes being longitudinally disposed in the casing and annularly arranged about the peripheries of a plurality of supporting disks 54, each of which is keyed to a centrally disposed manifold drain pipe 37$^a$ and one of which is provided for each filter leaf. Each of the draining nipples 43$^a$ is connected with one of these small drain pipes 53 and a member 55 is provided for rigidly securing each nipple in the corresponding pipe, the ends of the small pipes 53 being manifolded into the central manifold pipe 37$^a$ in any suitable manner. The supporting rods 48$^a$ are threaded into the discs 54 at their inner ends instead of into the central pipe, as previously described, and carry loose clamping blocks 56 which overlap and engage one side of each adjacent small pipe 53, lock nuts 56$^a$ being threaded upon the supporting rods and engaging the clamping blocks to securely hold the pipes 53 in position on the supporting disks, the pipes 53 being prevented from moving on the peripheries of the disks by being seated in the recesses 54$^a$. The outer ends of the supporting rods 48$^a$ carry clamping plates 50$^a$ which engage the segmental rim members 51$^a$ in substantially the same manner as illustrated by Figure 4.

One method of washing the cakes in a filter of this construction is as follows: The cakes are formed either when the leaves are in stationary position or during the slow rotation of same and after they have built up to a given thickness, the supply of liquid to be filtered is shut off and wash water is admitted through the opening 52 or any other convenient opening in the filter body. This gradually displaces the unfiltered liquid between the leaves and removes any soluble material from the cake, eventually leaving the filter body filled with clear water between the cakes. In some instances, it may be found advisable to drain the unfiltered liquid through valve 36 before admitting the wash water and in this event, the wash water would preferably be admitted through the valve 36 or any other convenient opening in the bottom of the filter body for since at this stage, wash water, if admitted at the top of the filter body, would tend to wash the cakes off the leaves.

This drainage may be facilitated by admitting compressed air through pipe 52 or any convenient opening at the top of the filter. As soon as the excess unfiltered liquid is drained through the valve 36, water under pressure is admitted through the pipe 57. This pipe 57 is provided with a plurality of atomizing nozzles 57$^a$. One of these nozzles is located approximately on the center line between each pair of filter leaves. When it is desirable to wash cakes and thus remove any soluble solids or displace the filtrate, water under pressure is admitted through pipe 57 and projected from nozzle 57$^a$ in an atomized condition, which surrounds the cakes with an atmosphere of atomized water. At the same time, air pressure is maintained within the filter body. This pressure, however, is materially lower than the pressure of water in the pipe 57 so as to offer no hindrances to the water issuing from the nozzles. The atomized water settles on the surface of the filter cakes and is forced through same by the air pressure, with the result that the liquid contained within the cake previous to washing is displaced and forced out through pipe 37 to any convenient receptacle. When by test the issuing liquid shows that the soluble material has been removed from the cake as when clear water issues from the pipe 37, the pressure on the pipe 57 is cut off and air pressure allowed to continue in the filter chamber for a few moments. This tends to dry the cake, which may be immediately discharged at this point. The water may be either hot or cold depending upon the requirement. The advantage in this manner of washing is that a minimum amount of wash water is required and since the cakes are rotated during washing, the effect of the washing results are even without danger of the cake being washed off the leaves by erosion and furthermore, there is no excess wash water to be removed from the filter body before discharging the cakes.

The filter cakes may be removed from the filter leaves in any desired manner. After they have been disintegrated or broken up, they are forced out of the discharge outlet as by the screw conveyor, as previously described. For the purpose of disintegrating the cake and removing it from the filter, I may use the sluicing mechanism shown and described in my aforesaid Patent No. 1,313,929, in which event the pipe 57 would constitute the inlet manifold for the sluicing medium.

I make no claim herein for above described method as the same is covered in and forms the subject-matter of a copending application.

While I have illustrated and described one form of apparatus for practising the described method of filtration I would have it understood that I do not wish to be limited thereto, as the principles involved may be practised otherwise without departing from the spirit and scope of my invention as defined by the following claims.

Having thus described my invention, what I claim as new and desire to secure by Letters Patent is:

1. A filter including a plural part casing, means for hingedly connecting said parts so as to permit one part to move relatively to the other, a filter arranged in said casing, a conveyor mounted in the movable part for discharging the solid matter, and driving means for said conveyor inoperative when the casing is opened.

2. A filter of the clam shell type including a casing having a stationary upper part and a movable lower part hingedly connected thereto, a filter arranged in said casing and a conveyor mounted in the movable lower part for discharging the solid matter and driving means for said conveyor adapted to be rendered inoperative when the casing is opened.

3. A filter including a plural part casing, one of which parts is fixed, means for hingedly connecting the parts of the casing, a filter member arranged within the casing, a screw conveyor mounted in the movable part of the casing for discharging the solid matter, a pinion carried by the conveyor, a driving pinion having a fixed relation to the fixed part of the casing, said driving pinion normally meshing with the pinion on the conveyor when the casing is closed, said pinion on the conveyor being adapted to be automatically thrown out of mesh with the driving pinion when the movable part of the casing is swung away from the fixed part of the casing.

ERNEST J. SWEETLAND.